United States Patent [19]

Hawkes, Jr.

[11] 4,004,197
[45] Jan. 18, 1977

[54] PANELBOARD AND CIRCUIT BREAKER COMBINATION

[75] Inventor: George F. Hawkes, Jr., La Palma, Calif.

[73] Assignee: Westinghouse Electric Corporation, Pittsburgh, Pa.

[22] Filed: Oct. 8, 1975

[21] Appl. No.: 620,605

Related U.S. Application Data

[63] Continuation of Ser. No. 488,604, July 12, 1974, abandoned.

[52] U.S. Cl. .......................... 317/119; 339/198 N
[51] Int. Cl.² ...................... H02B 1/04; H02B 1/20
[58] Field of Search ................ 339/198 N, 22 B; 317/112, 119, 117, 18 D; 200/49, 50 A, 50 C, 293, 294, 280, 307, 162; 335/18

[56] References Cited

UNITED STATES PATENTS

| | | | |
|---|---|---|---|
| 2,874,338 | 2/1959 | Pease | 200/307 |
| 3,541,397 | 11/1970 | Kobryner | 317/119 |

*Primary Examiner*—Gerald P. Tolin
*Attorney, Agent, or Firm*—L. P. Johns

[57] ABSTRACT

A panelboard and circuit breaker combination characterized by a pair of load bus bars with a neutral bus bar therebetween, at least one circuit breaker having a housing and detachably mounted on the bus bars, the circuit breaker having clip means releasably connected to the neutral bus bar having at least one other clip means releasably connected to one of the load bus bars, the clip means being recessed within the housing, and the housing having opening means aligned with the clip means and in which the bus bars are disposed when connected to the clip means.

1 Claim, 3 Drawing Figures

PANELBOARD AND CIRCUIT BREAKER COMBINATION

This is a continuation of application Ser. No. 488,604, filed July 12, 1974, now abandoned.

BACKGROUND OF THE INVENTION

1. Field of the Invention:

This invention relates to electric distribution systems and, more particularly, to circuit breakers mounted on bus bars of a panelboard.

2. Description of the Prior Art:

Circuit breakers of prior construction have been provided with various means for connection to the load bus bars and neutral conductor of a service panel. Panelboards to which the circuit breakers are connected have likewise been provided with a variety of mounting and connection means for holding the circuit breakers in place. Various problems and disadvantages have existed due to such a combination of circuit breakers and panelboards including unbalanced loading, inconvenient wiring, as well as inconvenience in attaching and removing the circuit breaker when necessary.

SUMMARY OF THE INVENTION

It has been found in accordance with this invention that the foregoing problem may be overcome by providing a combination panelboard and circuit breaker comprising a panelboard having a pair of first and second load bus bars and an intermediate neutral bus bar equally spaced therebetween, the bus bars extending up-right and preferably having upper edges disposed in a single plane, at least one circuit breaker having a housing with openings aligned with and adapted to receive the upright bus bars, the circuit breaker comprising at least two clip means for engagement with the load and neutral bus bars, one clip means engaging one bus bar and the other clip means detachably engaging the other bus bar, the clip means being aligned with the corresponding openings in the housing, the housing comprising transversely spaced projections and corresponding recesses so that adjacent circuit breakers have interfitting surface means to provide for attachment of alternate circuit breakers on different bus bars in order to equalize the loading on the load bus bars.

The advantage of the panelboard and circuit breaker combination of this invention is that it enhances the mounting and dismounting of circuit breakers by providing connection to a neutral bus bar which, for ground fault circuit breakers is a particularly important advantage.

DESCRIPTION OF THE PREFERRED EMBODIMENT

Figure 1:
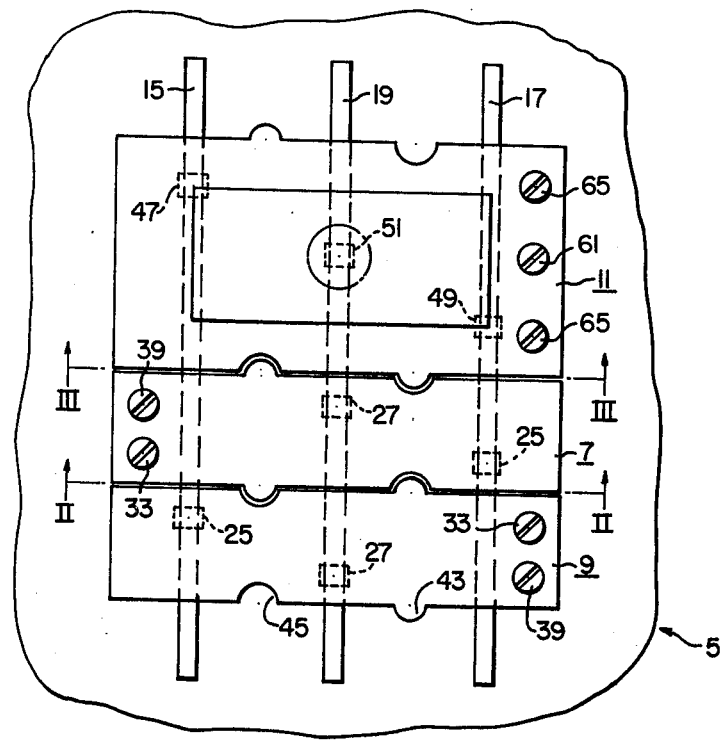
FIG. 1 is a plan view of a plurality of circuit breakers mounted on bus bars of a panelboard.
Figure 2:
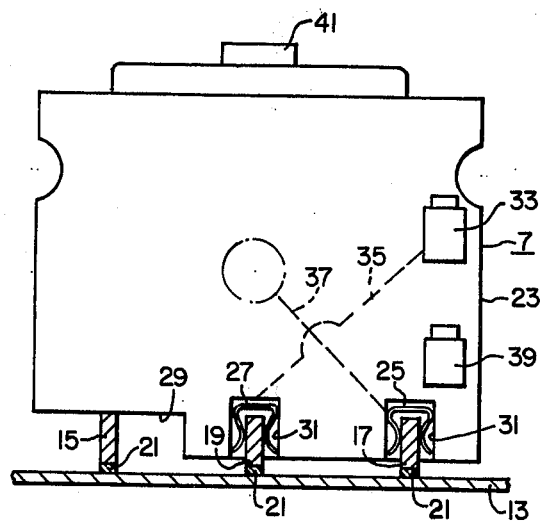
FIG. 2 is a vertical sectional view taken on the line 2—2 of FIG. 1 showing a single pole circuit breaker.
Figure 3:
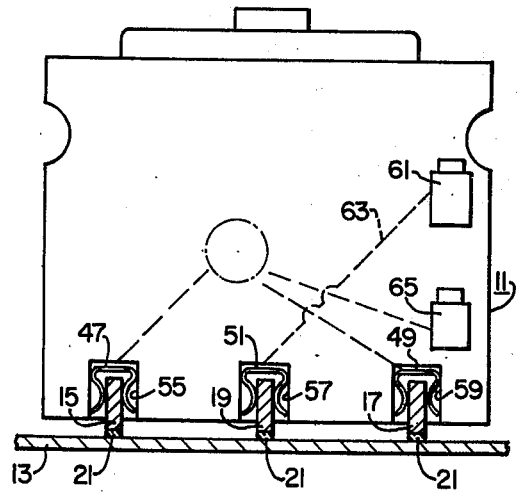
FIG. 3 is a vertical sectional view taken on the line 3—3 of FIG. 1 showing the two-pole circuit breaker.

In FIG. 1, a panelboard and circuit breaker assembly is shown which comprises a panelboard generally indicated at 5 and a plurality of circuit breaker 7, 9, and 11. The panelboard 5 comprises a base or mounting pan 13, a pair of parallel load bus bars 15, 17, and an intermediate neutral bus bar 19. The neutral bus bar is centrally located between the load bus bars 15 and 17. Insulating means such as insulators 21 are disposed between the bus bars 15, 17, 19 and the base 13. As shown in FIGS. 2 and 3, the bus bars 15, 17, 19 are preferably rectangular members extending upright with the longer axis of the bus bars being perpendicular to the plane of the base 13.

For purposes of description the circuit breaker 7 and 9 are single-pole circuit breakers and the circuit breaker 11 is a two-pole circuit breaker and their position as shown in FIG. 1 is merely exemplary of any number of positions with respect to each other. As shown in FIG. 2, the circuit breaker 7 comprises a housing 23 of electrically insulating material. The circuit breaker 7 is typical of both single-pole breakers 7 and 9 and comprises a conventional interior structure including relatively separable contacts and contact operating structure such as shown in U.S. Pat. No. 3,745,414. In addition, the circuit breaker 7 and 9 may also include the ground fault protection structure which is likewise shown in that patent.

In accordance with this invention, the circuit breaker 7 comprises a pair of spaced clip means 25, 27, such as plug-in type terminal structures by which the circuit breaker 7 is attached to the bus bars. More particularly, the clip means 25 engages the load bus bar 17 and the clip means 27 engages the neutral bus bar 19. Inasmuch as the circuit breaker 7 is a single pole circuit breaker, the bus bar 15 serves merely as a support for the circuit breaker 7 without having an electrical contact therewith. For that purpose, the housing 23 may be provided with a cut-away portion 29, one surface of which engages the upper end of the bus bar 15.

As shown in FIG. 2, the housing is likewise provided with opening means or recesses 31 for each clip means 25, 27, the recesses 31 are aligned with the clip means to enable insertion of the bus bars 17, 19 into the housing, wherein the clip means 25, 27 are located.

The circuit breaker 7 is also provided with a neutral terminal 33, which is connected to the clip means 27 by a conductor 35. The clip means 25 for the load bus bar 17 is connected in a conventional manner such as conductor means 37 to one of the movable or stationary contacts (not shown) within the circuit breaker. Moreover, a load terminal 39 is provided on the circuit breaker in a conventional manner. Furthermore, a handle 41 is provided for actuating the circuit breaker manually.

In addition to the foregoing, the opposite side surfaces of the several circuit breakers 7, 9, 11 are provided with interengaging or key means including projections 43 and recesses 45 at transversely spaced positions with respect to the longitudinally-extending bus bars 15, 17, 19. The projections and recesses may be of any corresponding configuration, such as semicircles or vertically-extending ridges and grooves. By providing such interfitting means adjacent single-pole circuit breakers 7 and 9 may be oppositely oriented in order to connect the clip means 25 of the circuit breaker 7 on the load bus bar 17 and the clip means 25 of the adjacent circuit breaker 9 on the load bus bar 15. By placing single-pole circuit breakers in alternate positions, such as circuit breaker 7 and 9, the loads on the bus bars 15 and 17 are substantially equally distributed. Moreover the double-pole circuit breaker 11 may have all recesses 45, instead of recesses and projections 43, and be more useful.

The two-pole circuit breaker 11, being shown more particularly in FIG. 3, comprises a pair of load clip means 47, 49 as well as neutral clip means 51. In addition, the circuit breaker housing 53 comprises opening means or recesses 55, 57, 59 which are aligned with the corresponding clip means 47, 49, 51, in order to enable insertion of the load and neutral bus bars 15, 17, 19, into the recessed clip means. A neutral terminal 61 is connected to the neutral clip means 51 by a conductor 63 and a pair of similar line terminals 65, one of which is connected to the clip means 47 and the other of which is connected to the clip means 49. Accordingly, for the two-pole circuit breaker 11 as shown in FIG. 1, the clip means 47 is connected to the load bus bar 15 and the clip means 49 is connected to the load bus bar 17, thereby distributing operation of the two-pole circuit breaker between the two load bus bars 15 and 17.

Accordingly, the device of this invention provides means for eliminating prior existing unbalanced loading problems that existed between circuit breakers and panelboards of traditional construction.

What we claim is:

1. A panelboard and circuit breaker combination comprising a panelboard having a pair of load bus bars and a neutral bus bar between the load bus bars, the load and neutral bus bars being coextensive and extending upright from one side of the panelboard, at least two circuit breakers mounted on the bus bars in side-by-side positions, one of the circuit breakers being releasably connected to the neutral bus bar and one of the load bus bars, the other of the circuit breakers being releasably connected to the neutral bus bar and the other of the load bus bars, each circuit breaker having a housing with a projection and a recess on each side, and the projection and recess of each circuit breaker being mutually interfitting with the corresponding recess and projection of an adjacent circuit breaker when the circuit breakers are properly connected with the bus bars.

* * * * *